United States Patent [19]

Lockhart et al.

[11] Patent Number: 5,256,315
[45] Date of Patent: Oct. 26, 1993

[54] GELLABLE AQUEOUS COMPOSITIONS CONTAINING POLYMERS WITH SPECIAL CHELATING FUNCTIONAL GROUPS USEFUL FOR RECOVERING OIL FROM AN OIL FIELD

[75] Inventors: Thomas P. Lockhart, San Donato Milanese; Fabrizio Bonaccorsi, Livorno, both of Italy

[73] Assignees: Eniricerche S.p.A.; AGIP S.p.A., both of Milan, Italy

[21] Appl. No.: 793,524

[22] Filed: Nov. 18, 1991

[30] Foreign Application Priority Data

Nov. 23, 1990 [IT] Italy .................... 22173 A/90

[51] Int. Cl.$^5$ ............... E21B 43/26; E21B 43/16
[52] U.S. Cl. .................. 252/8.551; 523/130; 526/304; 526/312; 525/360; 166/295; 166/308
[58] Field of Search .......... 526/304, 312; 525/360; 523/130; 252/8.551

[56] References Cited

U.S. PATENT DOCUMENTS

| | | | |
|---|---|---|---|
| 3,331,773 | 7/1967 | Gunderson et al. | 526/312 X |
| 3,422,139 | 1/1969 | Talet et al. | 526/304 X |
| 3,444,124 | 5/1969 | Talet et al. | 526/304 X |
| 4,137,182 | 1/1979 | Golinkin . | |
| 4,193,796 | 3/1980 | Campbell et al. | 526/312 X |
| 4,228,257 | 10/1980 | Campbell et al. | 526/312 X |
| 4,289,676 | 9/1981 | Czauderna et al. | 526/304 X |
| 4,360,425 | 11/1982 | Lim et al. | 526/304 X |
| 4,610,305 | 9/1986 | Martin et al. | 526/304 X |
| 4,774,283 | 9/1988 | Goldstein | 526/304 X |
| 4,844,970 | 7/1989 | Goldstein et al. | 526/304 X |
| 4,920,188 | 4/1990 | Sakashita et al. | 526/304 X |

FOREIGN PATENT DOCUMENTS

| | | |
|---|---|---|
| 0019169 | 11/1980 | European Pat. Off. . |
| 0056664 | 7/1982 | European Pat. Off. . |
| 0206489 | 12/1986 | European Pat. Off. . |
| 0390279 | 10/1990 | European Pat. Off. . |

*Primary Examiner*—Gary Geist
*Attorney, Agent, or Firm*—Oblon, Spivak, McClelland, Maier & Neustadt

[57] ABSTRACT

Gellable compositions containing:
 (a) water;
 (b) a water-soluble organic polymer bearing special chelating functional groups;
 (c) a multi-valent metal ion capable of causing the polymer to crosslink,
are useful to recover oil from a oil field.

Said compositions make it possible gels to be obtained which are endowed with improved physical properties and show a higher stability under the conditions prevailing in the oil field.

17 Claims, No Drawings

GELLABLE AQUEOUS COMPOSITIONS CONTAINING POLYMERS WITH SPECIAL CHELATING FUNCTIONAL GROUPS USEFUL FOR RECOVERING OIL FROM AN OIL FIELD

The present invention relates to novel aqueous gellable compositions useful to recover oil from an oil field. The gels obtained from said compositions show improved physical properties and a better stability under the conditions prevailing in the oil field.

It is well known that at the end of the primary step of recovery of oil from an oil field, i.e. the recovery performed thanks to the natural energy of oil stock or by using mechanical energy, still a considerable amount of oil remains inside the oil field. In order to increase the amount of oil which can be extracted, therefore secondary recovery techniques are usually adopted, which essentially consist in injecting a fluid - generally water or a polymeric solution or such as gas as carbon dioxide or steam, into the oil field, which fluid drives the raw oil to the production well.

However, owing to the unevenness of the reservoir rock, which is constituted by regions with different permeability, such fluids tend to preferentially flow through higher-permeability regions. On the contrary, low-permeability regions remain unfluxed, or only partially fluxed and this prevents therein contained oil from being extracted.

A solution to this problem consists in modifying the permeability of the oil field by the complete or partial occlusion of the high-permeability regions, so that the flow of the fluid subsequently injected into the oil field to recover oil can be diverted towards low-permeability regions.

One among most used techniques for that purpose is based on the injection into the oil field of an aqueous solution of a gellable polymer, and subsequent in-situ formation of polymeric gels.

The gellable solutions used for that purpose are generally constituted by a water-soluble organic polymer of either synthetic or natural origin, crosslinkable by means of a multi-valent metal ion, and a multi-valent metal ion. In order that crosslinking may take place, it is necessary that the polymer contains functional groups capable of binding the metal ion used for that crosslinking. The polymers which are customarily used in the art contain mono-carboxy functional groups.

Tipical examples of synthetic polymers are polyacrylamies in which a portion of amide groups are hydrolysed to yield carboxy groups, whereas typical examples for polymers of natural origin are Xantan ® gum and carboxymethylcellulose.

So, e.g., U.S. Pat. No. 4,683,949 teaches to modify the permeability of an oil field by the use of aqueous, in-situ gellable compositions which contain a polyacrylamide and a $Cr^{3+}$-based crosslinking agent.

However, the stability and physical strength of gels obtained from the polymers known from the prior art is not very high, in particular when these gels are submitted to the pressure applied by the displacing fluids injected into the oil field for oil recovery.

The stability of the gel and its mechanical strength can be increased by increasing the percent content of functional groups capable of binding the metal ion, or by increasing the concentration of the polymer or of the same metal ion. However, increasing the level of functional groups may cause the polymer to precipitate in the presence of bivalent metals such as $Ca^{2+}$ $Mg^{2+}$, whereas increasing the concentration of the polymer or the concentration of the multi-valent metal ion is not only disadvantageous from an economic or environmental viewpoint, but, inasmuch as such a contrivance increases the gel formation rate, it makes it difficult the position of said gel in oil field to be controlled.

The gels of polymers crosslinked with multi-valent metal ions can be used also in techniques of oil field fracturing. Such techniques are essentially based on the injection into the oil field of a high-viscosity fracturing field, at such a pressure as to cause fractures to occur inside reservoir rock, which facilitate the egress raw oil.

The fracturing fluid is generally constituted by water containing a gelled polymer or a gellable composition and a support material (proppant), such as, e.g., finally dispersed sand. At the end of the fracturing the gel must be then "broken" in order to be able to remove it from the fracture and make it possible oil to come out.

Examples of polymeric gels which are applied in the field of oil field fracturing are those obtained from biopolymers bearing functional poly-hydroxy groups crosslinkable with $B^{3+}$, such as disclosed, e.g. in U.S. Pat. No. 3,058,909.

However, such gels are unstable and their propensity to flow, already significant at room temperature, strongly increases at higher temperatures, a fact which strongly limits their possibilities of use.

On the contrary, in U.S. Pat. No. 4,137,182, a fracturing composition is disclosed, which is based on an acrylamide-methacrylate copolymer crosslinkable with $Cr^{3+}$, in which the gel is stabilized by the addition of oxalate.

The present applicant has found now that the drawbacks of the prior art can be overcome by means of the use of a new aqueous, gellable composition useful to recover oil from an oil field, which composition uses water-soluble organic polymers bearing special chelating functional groups.

Such a composition makes it possible gels to be obtained which are endowed with improved physical properties and with higher stability, resulting to be particularly useful both for modifying the permeability of an oil field and for fracturing of reservoir rock, in particular as a function of the selected crosslinking agent.

Therefore, a purpose of the present invention is an aqueous, gellable composition useful for recovering oil from an oil field.

A further purpose of the present invention is the use of said composition in the processes of recovery of oil in which the values of permeability inside the oil field are modified.

Another purpose of the present invention is the use of said composition in the processes of fracturing an oil field.

Still further purposes of the invention will be evident from the following disclosure and experimental examples.

In particular, the aqueous, gellable composition according to the present invention comprises:
(a) water;
(b) a water-soluble organic polymer crosslinkable by means of a multi-valent metal ion, consisting of acrylamide units and units bearing chelating functional groups, which can be represented by the formula

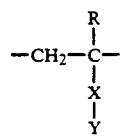 (I)

in which
R is H or CH₃;
X is phenyl or —(CH₂)$_n$— (in which n is comprised within the range from 1 to 4)

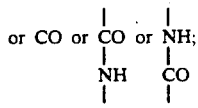

Y is a group selected from among the groups having the following structural formulae;

in which M is H or alkali metal or NH₄; Z is OH or COOM, and the substituents on the benzene ring are in ortho position to each other, with said units of formula (I) being contained in amounts comprised within the range of from 0,7 to 20 mol percent, and preferably in amounts comprised within the range of from 0,7 to 6 mol percent;

(c) a multi-valent metal ion capable of causing the polymer to crosslink.

According to a particularly preferred form of practical embodiment, the units bearing functional chelating groups of the (b) polymer can be represented by the formula

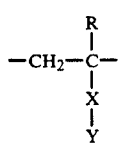 (I)

wherein R and X have the same meaning as reported above and Y is a group selected from among:

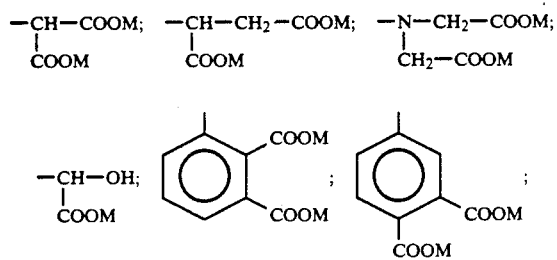

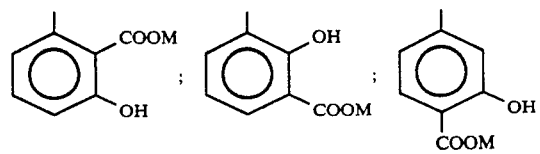

wherein M has the same meaning as reported above.

According to a most preferred form of practical embodiment, said units can be represented by the formula (I) in which Y is a group selected from group:

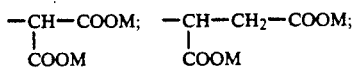

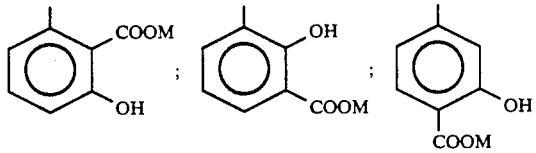

and X is the

group;
or in which Y is the group

—N—CH₂—COOM
 |
 CH₂—COOM and X is the group

|          |
CO   or   CH₂,
|          | in which M has the above meaning.

The (b) water-soluble organic polymer can furthermore additionally contain, besides acrylamide units and the units representable by the formula (I) still other units deriving from monomers copolymerizable with acrylamide known in the art, such as, e.g., methacrylamide, 2-acrylamido-2-methylpropanesulfonic acid, 2-vinyl-pyrrolidone or N-vinyl acetamide. The concentration of (b) polymer in the gellable composition according to the present invention can be comprised within the range of from 1,000 to 80,000 ppm, preferably of from 1,000 to 30,000 ppm, and its weight average molecular weight can comprised within the range of from 100,000 to 20,000,000 and, preferably, is comprised within the range of from 200,000 to 12,000,000.

The (b) water-soluble organic polymers can be obtained by copolymerization of acrylamide with a monomer responding to the formula:

in which
R is H or $CH_3$;
X is phenyl or $-(CH_2)_n-$ (in which n is comprised within the range from 1 to 4)

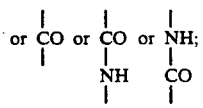

Y is a group selected from among the groups having the following structural formulae;

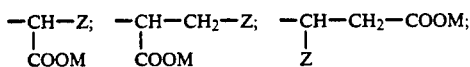

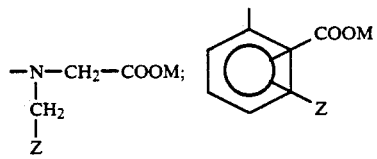

in which M is H or alkali metal or $NH_4$; Z i OH or COOM, and the substituents on the benzene ring are in ortho position to each other, by using the methodologies of free-radical initiated polymerization known from the prior art.

In general, the polymerization can be carried out by working in solution, in emulsion or in suspension, and preferably is carried out in solution. In practice, one operates in aqueous solution, by using free-radical initiators such as peroxides, persulfates or azo-compounds, such as, e.g., azo-bis-isobutyronitrile, potassium persulfate or the pair constituted by potassium persulfate/sodium metabisulfite, at a temperature which in general may be comprised within the range of from 30° to 80° C.

The monomers of formula (II), used in the preparation of the (b) polymers according to the present invention are known, or they can be prepared according to similar methodologies as used for known monomers.

The chelating units of formula (I) may also be introduced in the polymeric chain by chemically modifying a preformed polymer, by adopting methodologies known in polymers chemistry.

The (b) polymers according to the present invention can also be grafted to a biopolymer, using known techniques, such as reported, e.g., in Journal of Applied Polymer Science, 15, 2651 (1971) and in U.S. Pat. No. 4,676,317.

The multi-valent metal ion which constitutes the (c) component of the composition according to the present invention can be any of the multi-valent metal ions which are capable of crosslinking the (b) polymer by reacting with the chelating functional groups, such as, e.g. $Cr^{3+}$, $Al^{3+}$, $Ti^{4+}$, $Zr^{4+}$, $Sn^{4+}$, $Zn^{2+}$, $Y^{3+}$, $B^{3+}$, preferably $Cr^{3+}$ and $B^{3+}$.

The multi-valent metal ion can be introduced into the gellable composition according to the present invention as a water-soluble inorganic salt thereof. For example, $Cr^{3+}$ can be added to the composition as chrome nitrate, or, if a delayed gelling is desired, it can be added as a redox pair, comprising the metal ion in an oxidation state higher than as required for polymer crosslinking and a reducing agent, such as disclosed, e.g., in U.S. Pat. No. 3,785,437.

Alternatively to the use of a redox system, the gelling of the composition according to the present invention can be delayed by the use of organic binding agents capable of complexing the multi-valent metal ion, or by suitably regulating the pH value of the composition. Typical examples of gellable compositions with delayed gelling time are disclosed in patent applications to the same applicants name European Public. Nos. 0390279, 0390280 and 0390282.

The concentration in the composition of the multi-valent metal ion (c), expressed as metal, may be comprised comprised within the range of from 10 to 5000 ppm and preferably of from 25 to 2000 ppm, and the weight ratio of the (b) polymer to said metal ion (c) is kept comprised within the range of values of from 1:1 to 1000:1, and, preferably, of from 5:1 to 500:1.

To prepare the gellable composition according to the present invention both distilled water and water containing salts, such as, e.g., chlorides, sulfates or carbonates of alkali metals or alkali-earth metals, can be used.

The polymeric gels obtained from the crosslinking of the (b) water-soluble organic polymer with a multi-valent metal ion (c), are endowed with improved physical properties and with better properties of stability under the conditions prevailing in the oil field, compared to the gels obtained from polymers according to the prior art, bearing monocarboxy- and polyhydroxy functional groups.

The gellable aqueous compositions according to the present invention can be advantageously used, according to an aspect of the instant invention, to modify the permeability in an oil field. For such purpose, the multi-valent metal ion (c) preferably used to crosslink the (b) polymer is the $Cr^{3+}$ ion.

The polymeric gels which are obtained in this way show improved characteristics of physical strength and stability; in fact, they are characterized by values of elastic modulus (G') decidedly higher than of gels obtained from polymers known from the prior art, as reported in the following experimental examples.

The gellable polymeric compositions according to the present invention in which the multi-valent metal ion is $Cr^{3+}$ show furthermore a wider gelling range than of gellable polymeric compositions with $Cr^{3+}$, known from the prior art. For example, in those cases in which the (b) polymer is a polyacrylamide containing from 0.7 to 6 mol % of chelating units of formula (I), the upper limit of the range of pH values within which the gelling takes place, shows and increase which may range from 0.3 to 2 units, compared to the range of a polyacrylamide containing from 1 to 10 mol % of amidic groups hydrolyzed to yield carboxy groups, as illustrated in the experimental examples reported in the following.

Inasmuch as the upper limit of the pH range inside which gelling takes place is a value beyond which colloidal chrome is formed, which is no longer available for the crosslinking reaction [Lockhart T. P. et al, Macromolecules (1990) 23, 2402] and is harmful owing to the occlusions it may form in the injection well, the increase of such a threshold value involves the advantages:
* that the gelling of the composition can be obtained also in the presence of reservoir waters having pH values higher than the threshold value for the compositions known from the prior art, and
* that such reservoir water can be used to prepare the same gellable composition.

The modification of the permeability of the high-permeability regions of an oil field can be obtained in practice by injecting through the injection well, an aqueous solution containing the (b) polymer and a water-soluble salt of $Cr^{3+}$, e.g., chrome nitrate, or the polymer and the salt of $Cr^{3+}$ can be introduced by means of two successive injections. The gelling time can be controlled by the addition of binding agents, or by adjusting the pH value of the composition, as stated above. Furthermore, to the composition also buffering agents can be added, as taught by European patent application Publ.No. 0390281 to the same Applicant's name, as well as other stabilizers known from the prior art, such as, e.g., thiourea.

The gellable polymeric compositions according to the present invention can also be advantageously used to generate fractures in the reservoir rock, in order to facilitate the egress of oil from the field.

For that purpose, those (b) water-soluble organic polymers are preferably used, in which the units containing chelating functional units are selected from among those of Formula I in which Y is a group having one of the following structural formulae.

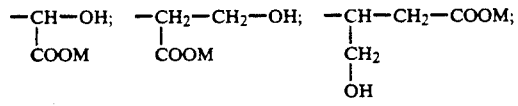

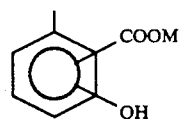

in which M is H or alkali metal or $NH_4$, and the substituents on the benzene ring are in ortho position to each other, and $B^{3+}$ as the multi-valent metal ion (c), generally supplied as sodium borate.

According to a most preferred form of practical embodiment, said units of formula (I) present in the (b) polymer are selected from among:

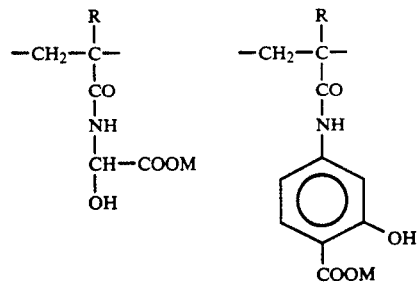

in which M and R have the above reported meaning.

The gels obtained in that way are endowed with improved properties which render them advantageous compared to those known from the prior art, as reported above.

In fact, differently from the gels of the prior art obtained by crosslinking biopolymers with $B^{3+}$, which are formed under alkaline pH conditions, the gels according to the present invention in which the multi-valent metal ion is $B^{3+}$, are formed and are stable in the acidic range of pH.

This property renders them particularly suitable for use in processes of fracturing oil fields with acidic or weakly acidic characteristics, without that a preliminary treatment of the oil field to increase the pH value thereof, is necessary.

Furthermore, differently from the gels of polymers crosslinked with $B^{3+}$ known from the prior art, the gels according to the present invention can be advantageously used in processes of acidic fracturation, in which the fracturing fluid also contains an acid capable of reacting with the reservoir rock. The gellable polymeric compositions of the present invention make it furthermore possible, gels much more stable than of the prior art to be obtained.

In fact, the gels of biopolymers with $B^{3+}$ are characterized by a reversibility of the bond between the polymer and the metal ion, which manifests itself already at room temperature, and leads to the complete conversion of the gel into a fluid, within a temperature range which in general may be comprised between 50° to 75° C.

On the contrary, the reversibility of the bond between the $B^{3+}$ metal ion and the (b) polymer of the present invention begins to manifest itself at temperatures higher than room temperatures, generally higher than 50° C., as demonstrated by the rheological tests reported in the experimental examples, and the complete conversion into a fluid only takes place at temperatures higher than 90° C.

The gellable polymeric compositions according to the present invention in which the multi-valent metal ion (c) is $B^{3+}$, can therefore be used within a wider temperature range than as allowed by the gels with $B^{3+}$ known from the prior art. Finally, the gel can be removed from the oil field by a simple treatment with steam, or by contact with an alkaline solution.

Besides the use for modifying the permeability and for the fracturation of the oil field, the gellable compositions according to the present invention can be also used as high-viscosity drilling fluids, as cementing agents, and to consolidate soil.

The following examples are reported for merely illustrative purposes and shall not be construed as being limitative of the purview of the invention.

EXAMPLES 1–8

In the following examples, the preparation is disclosed of polymers to be used as the (b) components of the gellable composition.

A method is described as well, for the synthesis of the monomers of formula (II) used to prepare the polymers.

1) Poly(acrylamide-co-4-acrylamido-salicylic acid) (AM/4-AMS)

a) Preparation of 4-acrylamido-salicylic acid) (4-AMS)

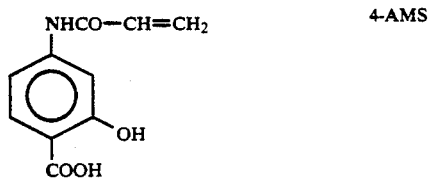

27 g (0.3 mol) of acryloyl chloride is added to a solution of 22.8 g of 4-amino-salicylic acid (0.15 mol) in 450 ml of 2N NaOH, with the temperature of the reaction mixture being always maintained comprised within the range of from 0° to 2° C. When addition is complete, the reaction is allowed to proceed for 2 hours at room temperature, then unreacted chloride is removed by extraction with methylene chloride and the aqueous phase is acidified to pH 4 and is extracted with ethyl acetate.

The organic extracts are then thoroughly desiccated and concentrated and the desired product is isolated by crystallization with ethyl ether. 14 g of product is obtained, the structure of which is confirmed by $^1$H-NMR spectroscopic analysis.

(b) Polymer Preparation 200 ml of deionized water, 20 g (0.282 mol) of acrylamide (AM), 1.81 g (0.0087 mol) of 4-AMS are charged to a reactor of 500 ml of capacity equipped with mechanical stirrer and condenser and the pH value of the mixture is adjusted at 9 by the addition of 2M NaOH. The solution is deaerated by means of a nitrogen stream flown through the reactor for 2 hours, the deaerated solution is heated to 60° C., and to it a solution of 23.8 mg (0.145 mmol) of 4,4'-azobisisobutyronitrile in 5 ml of tetrahydrofuran is rapidly added.

The reaction mixture is then maintained at 60° C. for 150 minutes.

After cooling down to room temperature, the polymer is isolated and purified by two precipitations at pH >10 with methanol, and is dried under reduced pressure, 20.32 g of polymer is obtained which at $^{13}$C-NMR analysis results to contain 2.6 mol % of units deriving from 4-AMS.

$M_w$ (as determined by GPC): $1.9 \times 10^{-6}$

2) Poly(acrylamide-co-2-allyl-malonic acid) (AM/2-ALM)

a) Preparation of 2-allyl-malonic acid (2-ALM)

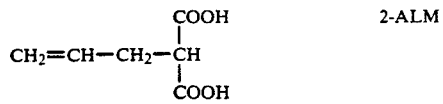

65 g of a basic resin (Amberlite IRA400; approximately 0.2 molar in OH) is added to a solution of 32 g (0.2 mol) of diethyl-malonate in 400 ml of anhydrous ethyl alcohol and 24.2 g (0.2 mol) of allyl bromide is added to the resulting suspension.

The reaction is allowed to proceed for 2 hours at room temperature and the resin is subsequently filtered off. The alcoholic solution is concentrated and then submitted to chromatography. 19 g of diethyl 2-allyl-malonate is obtained, which is subsequently hydrolysed by treatment with NaOH at 20%, under refluxing conditions, for 2 hours. The structure of the end product is confirmed by $^1$H-NMR spectroscopic analysis.

b) Polymer Preparation 3 ml of deionized water, 2.5 g (0.035 mol) of acrylamide, 0.5 2 g (0.0036 ml) of 2-ALM are added to a reactor of 100 ml of capacity equipped with mechanical stirrer and condenser, and the pH value of the resulting mixture is adjusted at 7 with 2M NaOH.

The solution is deaerated for 2 hours under a nitrogen flow, and then 10.4 mg (0.00386 mol) of potassium persulfate is added.

The mixture is heated to 60° C. and is kept at this temperature for 2.5 hours.

After cooling down to room temperature, the polymer is isolated and purified by two precipitations from methanol at pH >10 and is finally dried under reduced pressure.

2.95 g of polymer (100% conversion) is obtained which at $^{13}$C-NMR analysis results to contain 4.5 mol % of units deriving from 2-ALM.

$M_w$ (as determined by GPC): $1.3 \times 10^6$ g/mol

3) Poly(acrylamide-co-acrylimidodiacetic acid) (AM/AMD)

a) Preparation of acrylimidodiacetic acid (AMD)

30.8 g (0.342 mol) of acryloyl chloride is added to a solution of 16 g (0.12 mol) of iminodiacetic acid in 420 ml of 2N NaOH kept at the temperature of 0° C. The reaction mixture is then allowed to react for 2 hours at 0° C., and at the end the reaction mixture is extracted with ethyl acetate to remove unreacted acryloyl chloride.

· The aqueous phase is then caused to pass over a cationic resin and the fractions containing the desired product are freeze-dried and submitted to $^1$H-NMR spectroscopic analysis, which confirms their structure.

b) Polymer Preparation 200 ml of deionized water, 20 g (0.282 mol) of acrylamide, 1.63 g (0.087 mol) of AMD are charged to a reactor of 500 ml equipped with mechanical stirrer and condenser, and the pH values of the resulting mixture is adjusted at 9 with 2M NaOH.

The solution is deaerated for 2 hours by a nitrogen flow, is heated up to 60° C., and then a solution of 78.4 mg (0.29 mmol) of potassium persulfate in 5 ml of deionized water is added.

The reaction mixture is heated to 60° C. and is kept at this temperature for 90 minutes.

After cooling down to room temperature, the polymer is isolated and purified by two precipitations from methanol at pH >10 and is finally dried under reduced pressure.

21.3 g of polymer (100% conversion) is obtained which at $^{13}$C-NMR analysis results to contain 2.7 mol % of units deriving from AMD.

$M_w$ (as determined by GPC): $5.7 \times 10^6$ g/mol

4) Poly-(acrylamide-co-2-acrylamido-malonic acid) (AM/2-AMM)

a) Preparation of 2-acrylamidomalonic acid (2-AMM)

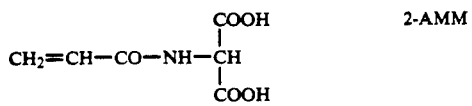

10.5 g (0.05 mol) of diethyl 2-aminomalonate is dissolved in 200 ml of 2N NaOH containing 50 mg of 3-methoxy-phenol as polymerization inhibitor.

To the solution, sheltered from light and kept cooled at 5° C., 13.75 g (0.152 mol) of acryloyl chloride is subsequently slowly added.

When addition is complete, the so obtained solution is kept with stirring for 1 hour at room temperature and, at the end, is extracted with ethyl acetate to eliminate unreacted acryloyl chloride.

The aqueous phase, which contains the disodium salt of 2-acrylamido-malonic acid, is caused to pass over a column packed with cation-exchange resin to convert the product into its acidic form and remove the excess of sodium hydroxide. The fractions which contain the product are then freeze-dried and 7.5 g of product is thus obtained. The structure of the product is confirmed by $^1$H-NMR spectroscopic analysis and mass spectrometry.

b) Polymer Preparation

The polymer is prepared, isolated and characterized as described under (3), using 1.5 g (0.0087 mol) of 2-AMM in lieu of AMD.

The reaction time is of 75 minutes.

20.7 g of polymer is obtained. The polymer contains 2.9 mol % of units deriving from 2-AMM.

5) Poly-(acrylamide-co-3-acrylamido-o-phthalic acid) (AM/3-AMF)

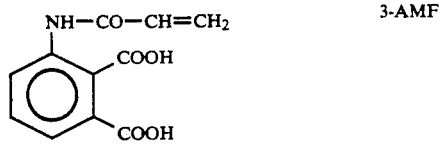

10 g (46 mmol) of 3-amino-1,2-benzenedicarboxy acid hydrochloride [the acid is previously obtained by hydrogenation of 4-nitro-1,2-benzenedicarboxy acid over platinum oxide, as reported in Journal of Organic Chemistry 25, 1882 (1960)] is dissolved in 150 ml of 2N NaOH and the resulting solution, cooled to 0° C., is admixed with 11 (122 mmol) of acryloyl chloride.

When addition is complete, the mixture is kept with stirring for 2 hours at room temperature and is eventually extracted with ethyl acetate to eliminate unreacted acryloyl chloride.

The aqueous phase is then acidified down to pH 4 and the reaction product is recovered by precipitation at 0° C.

After filtration, filter washing with THF and oven-drying under vacuum, 10 g of 3-acrylamido-1,2-benzenedicarboxy acid is obtained, the structure of which is confirmed by $^1$H-NMR spectroscopic analysis.

b) Polymer Preparation

The reaction of copolymerization of 3-AMF with acrylamide and the isolation and characterization of the polymer are carried out as described under (3), using 20 g (0.282 mol) of acrylamide, 2.23 g (0.0087 mol) of 3-AMF and 85.5 g of potassium persulfate as the catalyst.

23.4 g (conversion 100%) is obtained of polymer containing 3 mol % of units deriving from 3-AMF.

$M_w$ (as determined by GPC): $3.7 \times 10^6$ g/mol.

6) Poly-(acrylamide-co-4-acrylamido-o-phthalic acid) (AM/4-AMF)

The preparation of 4-acrylamido-o-phthalic acid (4-AMF) monomer and its copolymerization with acrylamide are carried out analogously to as described in the preceding example, using 3.8 g (0.0148 mol) of 4-AMF in lieu of 3-AMF.

The polymer obtained contains 4 mol % of unit deriving from 4-AMF.

$M_w$ (as determined by GPC): $3.2 \times 10^6$ g/mol.

a) Preparation of N-allyliminodiacetic acid (ALD)

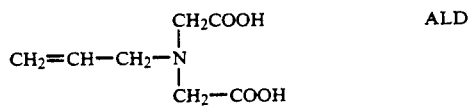

6.05 g (0.05 mol) of allyl bromide is added to a solution of 10 g (0.075 mol) of iminodiacetic acid in 100 ml of 2N NaOH.

The reaction is allowed to proceed for 3 hours at 40° C., and at the end of the reaction mixture is extracted with ethyl acetate to eliminate any unreacted allyl bromide.

The aqueous phase acidified to pH 3.5 is then concentrated and submitted to chromatography. The structure of the product is confirmed by $^1$H-NMR spectroscopic analysis and mass spectrometry.

b) Polymer Preparation 50 ml of deionized water, 8.5 g (0.1197 mol) of acrylamide, 4.5 g (0.0063 mol) of ALD are charged to a reactor of 100 ml of capacity, and the pH value of the mixture of adjusted at 4 with 0.5M NaOH.

The solution is deaerated for 30 minutes under a nitrogen stream and then 5.5 mg (0.0033 mmol) of 4,4'-azobisisobutyronitrile is added.

The reaction mixture is then heated up to 50° C. and is kept at this temperature for 3 hours and 15 minutes.

After cooling down to room temperature, the polymer is isolated and purified by two precipitations from methanol at pH >10 and is finally dried under reduced pressure.

2.77 g of polymer (50% conversion) is obtained which at $^{13}$C-NMR analysis results to contain 0.7 mol % of units deriving from ALD.

$M_w$ (as determined by GPC): $7.4 \times 10^6$ g/mol

8) Poly(acrylamide-co-N-acrylamidoglycolic acid) (AM/AMG)

This polymer was both prepared by copolymerization of N-acrylamidoglycolic acid which acrylamide, and by functionalization of a polyacrylamide.

In the first case, the process is as followed: 4.5 g (63.4 mmol) of acrylamide, 0.54 g of commercial N-acrylamido-glycolic acid (AMG), 50 ml of deionized water are charged to a reactor of 100 ml of capacity, and the pH value of the reaction mixture is adjusted at 7 by the addition of 2M NaOH.

The solution is deaerated for 2 hours by a flowing nitrogen stream, then is heated up to 60° C. and a solution of 18 mg (0.067 mmol) of potassium persulfate in 5 ml of deionized water is added to it.

The reaction mixture is kept at the temperature of 60° C. for 40 minutes.

After cooling and dilution, the polymer is isolated and purified with methanol as described in the foregoing examples, and it results to contain 4 mol % of units deriving from AMG.

$M_w$ (as determined by GPC): $2.4 \times 10^6$ g/mol

In the second case, the process is carried out as follows:

15 g (0.21 mol) of a commercial polyacrylamide (weight average molecular weight: $5-6.10^6$ g/mol) dissolved in 500 ml of deionized water is charged to a reactor of 1 liter of capacity. Then 3.89 g (42.2 mmol) of glyoxylic acid dissolved in 250 ml of deionized water, alkalified with 2M NaOH at pH 10.3 is added, with the addition being carried out over a 20-minutes time at room temperature and the solution of polyacrylamide being kept stirred.

The reaction mixture is then heated up to 60° C. and is maintained at that temperature for 2 hours.

The resulting polymer, after isolation and purification according to the usual procedures, contains 1.2 mol % of N-acrylamido-glycolic units.

EXAMPLE 9

By using homogeneous aqueous solutions of the polymers obtained as disclosed in Examples 1–8, eight samples of aqueous, gellable composition are prepared, each of which contains 100 ppm of $Cr^{3+}$, supplied as $Cr(NO_3)$, and 8000 ppm of polymer.

Also a reference sample is prepared by using a commercial polyacrylamide with a hydrolysis degree of 4.2%.

In Table 1, the maximum pH value at which gelling is observed, and the value of the elastic modulus (G') of the gel obtained at pH 5, are reported for each sample.

The pH value of the composition was adjusted to the desired value by preliminarily adding a buffer to the aqueous solution of the polymer (the buffer is selected from among pyridine, litudine and ethanolamine, according to the desired pH value, and in such an amount as to have a concentration of buffer in the end solution of about 0.03M), and eventually adding, if necessary, diluted solutions of hydrochloric acid or of NaOH.

TABLE 1

| Example | Polymer | Mol % of chelating units | Maximum gelling pH value | G' (Pa) |
|---|---|---|---|---|
|  | Polyacrylamide (4.2% hydrolysis) | — | 6.7 | 15 |
| 1 | AM/4-AMS[a] | 2.6 | 9 | 57 |
| 2 | AM/2-ALM | 4.5 | 7.5 | 46 |
| 3 | AM/AMD | 2.7 | 7 | 56 |
| 4 | AM/2-AMM | 2.9 | 8 | 46 |
| 5 | AM/3-AMF | 3 | 7 | 48 |
| 6 | AM/4-AMF | 4 | 7 | 54 |
| 7 | AM/ALD | 0.7 | 8 | 53 |
| 8 | AM/AMG | 1.2 | 8 | 56 |

[a] 15,000 ppm of polymer were used.

EXAMPLE 10

By mixing a homogeneous aqueous solution of AM/4-AMS polymer obtained as disclosed in Example 1, and an aqueous solution of sodium borate, a sample containing 12,000 ppm of polymer an 1,800 ppm of $B^{3+}$ was prepared. The solution is then acidified (pH 3.4) to obtain the formation of the gel.

A reference gel is also prepared, which is constituted by 5000 ppm of hydroxypropyl guar crosslinked with 350 ppm of $B^{3+}$.

The rheological behaviour of both gels is then studies at temperatures of 25° and 75° C., using a VOR Bohlim rheometer with cone-plate geometry. For each gel, the values of elastic modulus (G') and of viscous modulus (G") are measured within an oscillation frequency range of from 0.001 to 10 Hz.

In Table 2, the frequency (W) is reported at which G'=G". This value indicates in fact the threshold frequency above which the gel starts to flow (G'<G"). The higher the threshold value W, the higher the propensity of the gel to flow.

TABLE 2

| Gel | W (Hz) 25° C. | W (Hz) 75° C. |
|---|---|---|
| HPG/$B^{3+}$ | 0.001 | 0.1 |
| AM-AMS/$B^{3+}$ | (*) | 0.001 |

(*) within the range of frequencies taken into consideration, G' is always smaller than G" (i.e., the gel does not show any propensity to flow).

EXAMPLE 11

An aqueous solution (containing 0.5M NaCl) of 12,000 ppm of AM/AMG polymer (containing 4 mol % of AMG units) and 1,350 ppm of $B^{3+}$, supplied as sodium borate, is prepared. The pH value is subsequently adjusted at 1.5 by the addition of HCl.

The resulting gel is then submitted to the rheological tests disclosed in the preceding example, at the temperature of 65° C.

At such a temperature, throughout the temperature range taken into consideration, the elastic modulus G' is never lower than the viscous modulus G".

We claim:

1. An aqueous gellable composition comprising:
   (a) water;
   (b) a water-soluble organic polymer crosslinkable by means of a multi-valent ion, consisting of acrylamide units and units bearing chelating functional groups, and, optionally units which are copolymerizable with acrylamide, said units bearing chelating functional groups represented by the formula

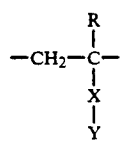 (I)

in which

R is H or CH₃;

X is phenylene, —(CH₂)$_n$— where n is within the range of 1 to 4,

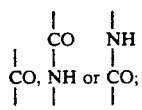

Y is selected from the group consisting of

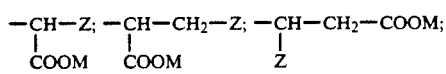

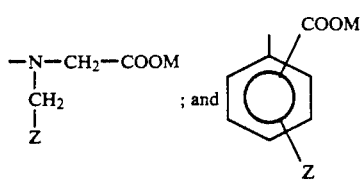

in which M is H, an alkali metal or NH₄; Z is OH or COOM, and the substituents on the benzene ring are in the ortho position to each other, wherein said polymer has a weight average molecular weight of from 200,000 to 20,000,000 and wherein said units of formula (I) are present in an amount within the range of from 0,7 to 20 mol percent with respect to the acrylamide units;

(c) a multi-valent ion capable of causing the polymer to crosslink selected from the group consisting of Cr³⁺, Al³⁺, Ti⁴⁺, Zr⁴⁺, Sn⁴⁺, Zn²⁺, Y³⁺ and B³⁺;

wherein the concentration of (b) in (a) is within the range of from 1000 to 50,000 ppm, the concentration of (c) in (a) is within the range of from 10 to 5000 ppm and the weight ratio of (b) to (c) is within the range of from 1:1 to 1000:1.

2. The composition according to claim 1, wherein the units of formula (I) are present in amounts within the range of 0.7 to 6 mol % with respect to the acrylamide units.

3. The composition according to claim 1, wherein the concentration of (b) in (a) is within the range of from 1000 to 30,000 ppm, the concentration of (c) in (a) is within the range of from 25 to 500 ppm and the weight ratio of (b) to (c) is within the range of from 5:1 to 500:1.

4. A composition according to claim 1, wherein X is selected from the group consisting of —(CH₂)$_n$— where n is within the range of from 1 to 4,

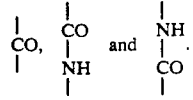

5. A composition according to claim 1, wherein X is phenylene.

6. A composition according to claim 1, wherein Y is

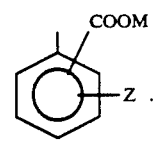

7. The composition according to claim 1, wherein Y is selected from the group consisting of:

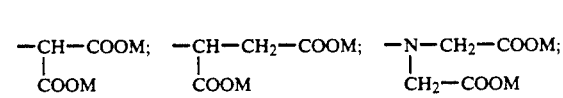

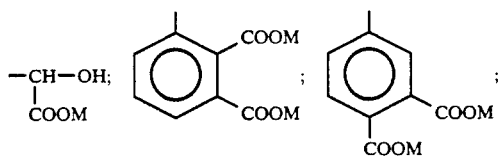

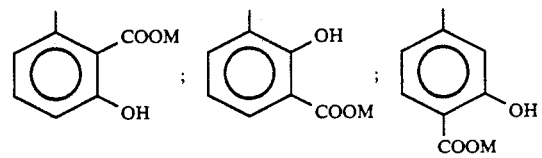

wherein M is H an alkali metal or NH₄.

8. The composition according to claim 1, wherein Y is selected from the group consisting of:

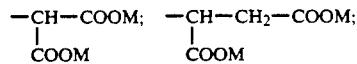

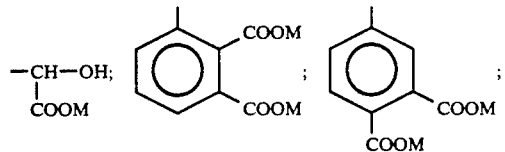

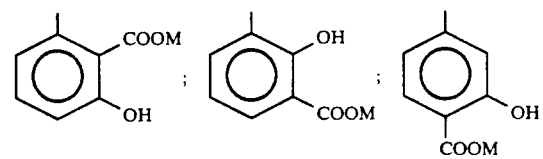

wherein M is H or alkali metal an NH₄, and X is

9. The composition according to claim 1, wherein Y is the group:

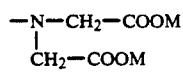

wherein M is H an alkali metal or NH$_4$, and X is

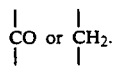

10. The composition according to claim 1, wherein the (b) polymer consists of acrylamide units, units bearing chelating functional groups, and units which are copolymerizable with acrylamide.

11. The composition according to claim 10, wherein said units copolymerizable with acrylamide are selected from the group consisting of methacrylamide, sodium 2-acrylamido-2-methyl-propane-sulfonate, N-vinyl-pyrrolidone and N-vinyl-acetamide.

12. A composition according to claim 1, wherein the multi-valent ion is B$^{3+}$ and wherein units of formula (I) are selected from the group consisting of:

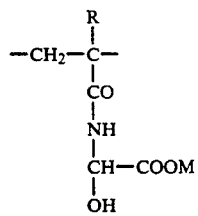 and 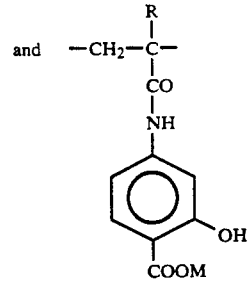

where M is H, an alkali metal or NH$_4$ and R is H or CH$_3$.

13. A composition according to claim 1, wherein the multi-valent ion is Cr$^{3+}$.

14. A composition according to claim 1, wherein the multi-valent ion is B$^{3+}$ and Y is selected from the group consisting of:

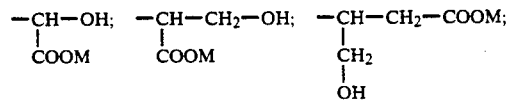

and

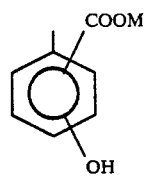

in which M is H, an alkali metal or NH$_4$, and the substituents on the benzene ring are in the ortho position to each other.

15. A process for modifying the permeability of an oil field comprising injecting the aqueous gellable composition according to claim 1 into the oil field.

16. A process for fracturing an oil field comprising injecting the aqueous gellable composition according to claim 1 and a support material into the oil field.

17. The process according to claim 16 wherein said support material is sand.

* * * * *